(12) United States Patent
Kamalahasan et al.

(10) Patent No.: US 9,231,896 B2
(45) Date of Patent: *Jan. 5, 2016

(54) COMPUTER SYSTEM AND COMPUTER-IMPLEMENTED METHOD FOR SERVICE AND APPLICATION LOAD TESTING

(71) Applicant: HARTFORD FIRE INSURANCE COMPANY, Hartford, CT (US)

(72) Inventors: Mahalingam Kamalahasan, Springfield, MA (US); Christopher Padmore, Simsbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,172

(22) Filed: Jul. 13, 2015

(65) Prior Publication Data
US 2015/0319117 A1    Nov. 5, 2015

Related U.S. Application Data

(63) Continuation of application No. 12/338,784, filed on Dec. 18, 2008, now Pat. No. 9,081,881.

(51) Int. Cl.
    *H04L 12/58*    (2006.01)
    *H04L 29/08*    (2006.01)
    *G06F 11/34*    (2006.01)

(52) U.S. Cl.
    CPC ............ *H04L 51/08* (2013.01); *G06F 11/3414* (2013.01); *G06F 11/3433* (2013.01); *H04L 67/02* (2013.01); *H04L 67/06* (2013.01)

(58) Field of Classification Search
    None
    See application file for complete search history.

(56) References Cited

U.S. PATENT DOCUMENTS

| | | |
|---|---|---|
| 5,742,754 A | 4/1998 | Tse |
| 6,601,192 B1 | 7/2003 | Bowman-Amuah |
| 6,697,964 B1 | 2/2004 | Dodrill et al. |
| 6,725,399 B1 | 4/2004 | Bowman |
| 6,766,481 B2 | 7/2004 | Estep et al. |
| 6,859,922 B1 | 2/2005 | Baker et al. |
| 6,865,691 B1 | 3/2005 | Brundridge et al. |
| 6,978,218 B1 | 12/2005 | Kolb et al. |
| 6,993,747 B1 | 1/2006 | Friedman |
| 7,000,224 B1 * | 2/2006 | Osborne et al. ............... 717/125 |
| 7,047,446 B1 | 5/2006 | Maurer et al. |
| 7,080,303 B2 | 7/2006 | Bowers |
| 7,111,059 B1 | 9/2006 | Garcea et al. |
| 7,155,723 B2 | 12/2006 | Swildens et al. |
| 7,188,158 B1 | 3/2007 | Stanton et al. |
| 7,272,822 B1 | 9/2007 | Riggins et al. |

(Continued)

*Primary Examiner* — Umut Onat
(74) *Attorney, Agent, or Firm* — Howard IP Law Group, PC

(57) ABSTRACT

A computer system for use in load testing a service-oriented architecture (SOA) service has a processor and a memory storage device in communication with the processor. The processor is adapted to receive an XML message, an address for a service to be tested, an action compliant with a protocol for exchanging structured information in a decentralized, distributed environment and associated with the service; create and store in memory a template message package compliant with the protocol; create a populated message package compliant with the protocol by incorporating in the template message package the XML message, the address and the action; establish a connection to the service and furnish one or more documents and attachments to the service; and receive a response from the service.

20 Claims, 17 Drawing Sheets

(56) References Cited

U.S. PATENT DOCUMENTS

| | | |
|---|---|---|
| 7,299,382 B2 | 11/2007 | Jorapur |
| 7,334,219 B2 | 2/2008 | Cebula et al. |
| 7,346,676 B1 | 3/2008 | Swildens et al. |
| 7,356,736 B2 | 4/2008 | Natvig |
| 7,366,955 B2 | 4/2008 | Kuturianu et al. |
| 7,406,626 B2 | 7/2008 | Shen et al. |
| 7,454,660 B1 | 11/2008 | Kolb et al. |
| 7,747,945 B1 | 6/2010 | Babka et al. |
| 2002/0035488 A1 | 3/2002 | Aquila et al. |
| 2002/0147942 A1 | 10/2002 | Moe et al. |
| 2004/0008825 A1 | 1/2004 | Seeley et al. |
| 2004/0041827 A1 | 3/2004 | Bischof et al. |
| 2005/0021274 A1 | 1/2005 | Eden et al. |
| 2005/0044197 A1* | 2/2005 | Lai .................................. 709/223 |
| 2005/0125188 A1 | 6/2005 | Eden et al. |
| 2005/0182666 A1 | 8/2005 | Perry et al. |
| 2005/0267976 A1* | 12/2005 | Chang et al. .................. 709/230 |
| 2006/0059021 A1 | 3/2006 | Yulman et al. |
| 2006/0075387 A1 | 4/2006 | Martin et al. |
| 2006/0150026 A1 | 7/2006 | Kolawa et al. |
| 2006/0276997 A1 | 12/2006 | Drees |
| 2007/0006045 A1 | 1/2007 | Mooney et al. |
| 2007/0061103 A1 | 3/2007 | Patzschke et al. |
| 2007/0240102 A1 | 10/2007 | Bello et al. |
| 2008/0163064 A1 | 7/2008 | Swildens et al. |
| 2008/0222650 A1 | 9/2008 | Scurlock, Jr. |
| 2009/0132856 A1 | 5/2009 | Gorman et al. |

* cited by examiner

```
Start Page  noname67 - Web (HTTP/HTML)
  vuser_init
  Actions
  vuser_end
  globals.h
                                                                                    ⎫
                                                                                    ⎬ 646
                                                                                    ⎭ web_custom_request ("AI3ToAcordXmlTranslateBOPPolicyAddRqSCPort",
  "URL=http://wsfoundationservicesqa/AL3XML/services/AI3ToAcordXmlTranslateBOPPolicyAddRqSCPort",
  "Method=POST",
  "Resource=0",
  "RecContentType=multipart/related",
  "Referer=",
  "Snapshot=t1.inf",
  "Mode=HTML",
  "EncType=multipart/related; type=\"text/xml\"; boundary=\"____Part_0_15696851.1217352198519\"",
  "Body=____Part_0_15696851.1217352198519\r\nContent-Type: text/xml; charset=utf-8\r\n\r\n<Envelope xmlns=\"h
t<ns6 : underwritingModel/>\r\n\t\t\t</ns6  :Stylesheet InfoBean>\r\n\t\t\t<xmlAttachment href=\ "cid:AL3MSG\ m " xmln
" 4              DEEPA SEKAR         01210184SR         01UE DL11510121018 4
"                                                      0804043NBS             A200804042008040
"          WINDSOR         CT06006     0001080404       HARTFORD        5BPI282 7 F1000015BISB10001
"
"
" F200015BPIF10001         CT                  Y0010001              6CAS140 1 F200015BPIF10001     08041
"                           WINDSOR                     WINDSOR        CT060061234560000No Hit    NoHit        THI
" F200015BPIF10001                                                                                 AUTOBOwnedVehSchedOnNotSchedCd
" uvAUTOBGenQuestions                                  NO                     UWSM210  F200025BPIF100001    uw
"
" HAPP500  F200015BPIF100001  52611Nursery & Garden Shop                       17 MAIN RD
" HDUP400  F200015BPIF100001  WELCOME225                                          00N
"                        S                        HCOM300  F200015BPIF100001  21018412345700000BBT09786
" 010000000000000000000000                                                       5SSG052  J100015BPIF1\
"                                                                                                6CVC182 2 W1
" R100025SSGJ10001  6601      N               E00012                                              5 OR I
" R200015CARR10001              ON
"         3MTG240  00000000
LAST):

return 0 ;
}
```

*Fig. 6F*

```
File  Edit  View  Insert  Vuser  Actions  Tools  Window  Help
```

```
Start Page | noname68 - Java Vuser
  vuser_init
  Actions
  vuser_end
```

```
/*
 * LoadRunner Java script.
 * @Author - Mahalingam Kamalahasan (Kamal)
 * The user is IBM Mainframe communicating to the Mid Tier JMS Wrapper application.
 * The communication between Mainframe and the Mid-Tier is through IBM MQ.
 * Script Description:
 */
import lrapi.lr;
//IBM MQ Packages
import javax.jms.Message;
import javax.jms.QueueConnection;
import javax.jms.QueueReceiver;
import javax.jms.QueueSender;
import javax.jms.QueueSession;
import javax.jms.TextMessage;

import com.ibm.mq.jms.JMSC;
import com.ibm.mq.jms.MQQueue;
import com.ibm.mq.jms.MQQueueConnectionFactory;

//File Packages
import java.io.BufferedReader;
import java.io.File;
import java.io.FileReader;
import java.io.FileNotFoundException;
import java.io.IOException;

public class Actions
{
    MQQueueConnectionFactory mQueueFactory;
    QueueConnection mQueueConnection;
    QueueSession session;
    long mUniqueTime=0L;
```

830

832 — Code copied from the plugin-tool.

*Fig. 8C*

COMPUTER SYSTEM AND COMPUTER-IMPLEMENTED METHOD FOR SERVICE AND APPLICATION LOAD TESTING

CROSS REFERENCE TO RELATED APPLICATIONS

This application is a continuation application of U.S. patent application Ser. No. 12/338,784, filed Dec. 18, 2008, which is now U.S. Pat. No. 9,081,881 B2 issued on Jul. 14, 2015, entitled "Computer System and Computer-Implemented Method for Use in Load Testing of Software Applications", the entire contents of which is hereby incorporated herein by reference for all purposes.

FIELD OF INVENTION

The present invention relates to computer systems, and particularly to computer systems for load testing of software applications.

BACKGROUND

Server software that interfaces with numerous users, such as software running on web servers that are used in retail, financial services and other fields, are conventionally load tested prior to deployment by scripts that emulate the actions of numerous users. The scripts are run on computer systems in communication with the server software deployed in a test environment. Such server software may include service-oriented architecture (SOA) services. In some applications, data is conveyed between user systems and a server using documents compliant with an XML extension suitable to the particular type of data involved.

For emulation of users providing simple XML documents, automated tools are available to develop scripts. However, in certain applications, XML documents may include attachments. By way of non-limiting example, attachments to XML documents may include image files, such as jpg, tiff, pdf or other file formats. XML documents may be relatively complex for some applications. Scripts that are able to emulate users generating complex XML documents and XML documents with attachments are developed by experienced programmers.

Similarly, load testing of software running on servers using message queues, in which requests from users are placed in a queue and later responded to, is desirable. However, such load testing has generally not been performed because of the time of experienced programmers that would be required in order to generate scripts required to emulate numerous users.

SUMMARY OF THE INVENTION

In one embodiment, a computer system for use in load testing a service-oriented architecture (SOA) service has a processor and a memory storage device in communication with the processor. The processor is adapted to: receive an XML message, an address for a service to be tested, an action compliant with a protocol for exchanging structured information in a decentralized, distributed environment and associated with the service; create and store in memory a template message package compliant with the protocol; create a populated message package compliant with the protocol by incorporating in the template message package the XML message, the address and the action; establish a connection to the service and furnish one or more documents and attachments to the service; and receive a response from the service.

In an embodiment, a computer system for use in load testing computer software applications employing an asynchronous communications protocol on a mainframe computer system has a processor and a memory storage device in communication with the processor. The processor is adapted to: receive as inputs a connection name for the mainframe computer system and message queue identification information; create and store in memory an executable file for providing messages to the message queue and receiving replies from the message queue, the executable value having undefined variables; assigning definitions to the undefined variables based on the received inputs; based on the definitions and the executable file, generate an executable file in JAVA format, and store the generated JAVA format file in the memory storage device, and cause the generated JAVA format file to be displayed.

In an embodiment, a method implemented in a computer having a processor and a memory in communication with the processor, includes receiving by the processor an XML message, an address for a service to be tested, and an action compliant with a protocol for exchanging structured information in a decentralized, distributed environment and associated with the service; creating and storing by the processor in the memory a template message package compliant with the protocol; creating by the processor a populated message package compliant with the protocol by incorporating in the template message package the XML message, the address and the action; establishing by the processor a connection to the service and furnishing one or more documents and attachments to the service; and receiving by the processor a response from the service.

In an embodiment, a computer-implemented method, in a computer having a processor and a memory coupled to the processor, for use in load testing computer software applications employing an asynchronous communications protocol on a mainframe computer system, includes: receiving by the processor as inputs a connection name for the mainframe computer system and message queue identification information; creating and storing by the processor in the memory an executable file for providing messages to the message queue and receiving replies from the message queue, the executable value having undefined variables; assigning by the processor definitions to the undefined variables based on the received inputs; based on the definitions and the executable file, generating by the processor an executable file in JAVA format, and storing the generated JAVA format file in the memory storage device, and causing the generated JAVA format file to be displayed.

BRIEF DESCRIPTION OF DRAWINGS

FIG. 6F is an exemplary screen shot created in connection with an implementation of a method wherein recorded instructions are used to generate code for providing simulated users.

FIGS. 8A, 8B and 8C are exemplary screen shots created in connection with an implementation of a method illustrated in FIG. 5.

DETAILED DESCRIPTION

Figure 1:
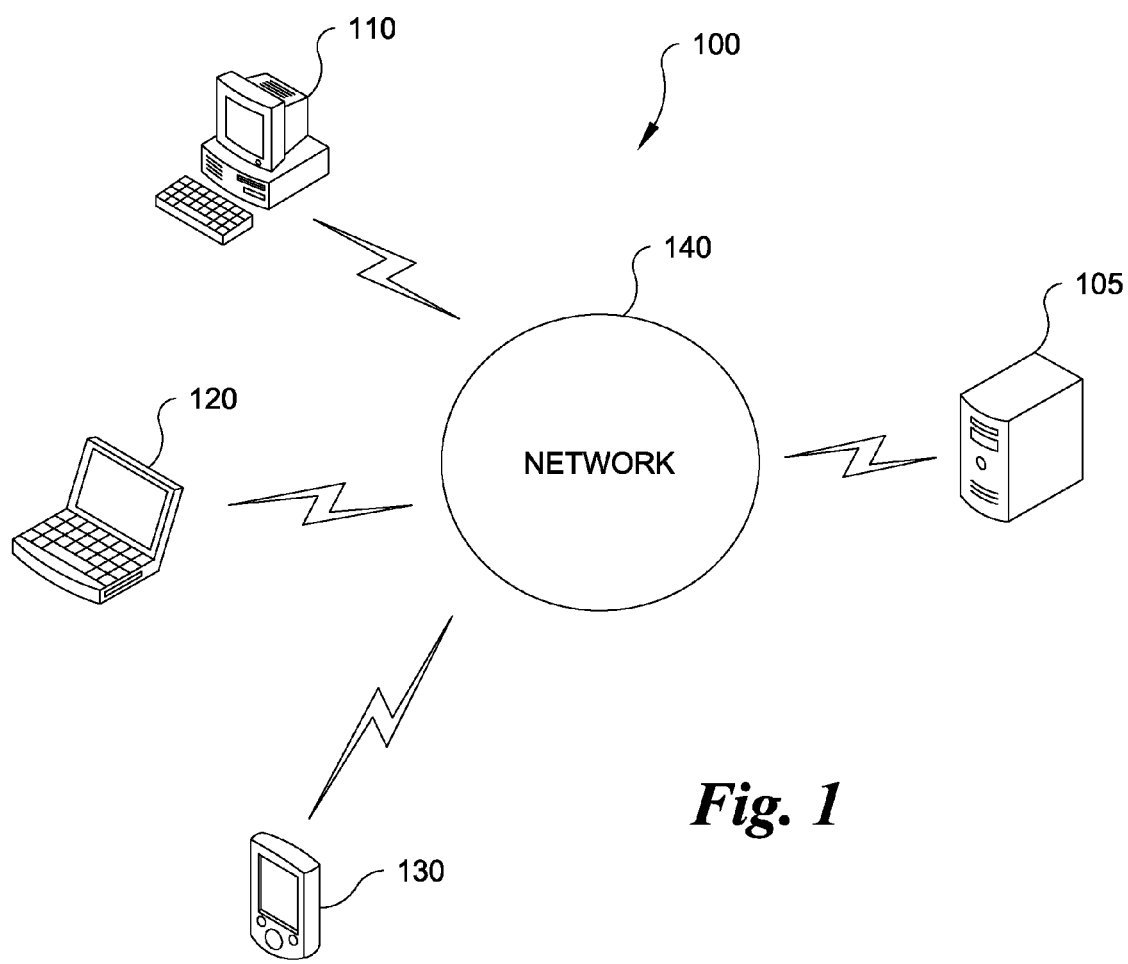
FIG. 1 is a schematic diagram of an exemplary network for implementation of a method and system of the invention.

It is to be understood that the figures and descriptions of the present invention have been simplified to illustrate elements that are relevant for a clear understanding of the present invention, while eliminating, for the purpose of clarity, many other elements found in typical computer systems, and methods, systems, and computer program products for load testing of software running on computer systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

A challenge recognized by the inventors is that the generation of test scripts requires significant investments of time by highly skilled programmers. One particular challenge is a difficulty in prior art tools in generating test scripts for simulating complex XML documents and XML documents with attachments. For example, particular XML standards, such as the ACORD XML standard used for communication of insurance-related information, result in relatively complex XML documents and often require the use of attachments, such as image files. For example, attachments used in connection with insurance transactions may include images of damaged vehicles and property. By way of further example, in SOAP compliant message packets, any entities other than a primary SOAP 1.1 message that are not lexically within the SOAP message but are related in some manner may be deemed attachments. Such other entities may contain data in formats other than XML, e.g. in jpg or gif formats. The primary SOAP 1.1 message in a message package may reference the additional entities.

In messages employed in the insurance field using ACORD XML messages, critical business information is conveyed. For example, brokers may communicate data relating to applications for coverage, including such critical information as the identity of the applicant for insurance, the category of policy and proposed terms, the address of real property to be insured, the vehicle identification information and garage address of vehicles to be insured, the drivers license number of a driver to be insured, and other information. Claimants and brokers may provide information regarding claims, including policy number, claimant identity, identity of possible adverse parties, incident date, incident location, photographs of damaged vehicles, damaged real property and accident locations, and other information. Insurance companies may provide information confirming coverage terms and conditions, premium amounts and premium due dates, required additional information and forms, and other information. As a result of the complexity of the underlying business transactions, a wide variety of information may be carried in ACORD XML messages. In order to carry such a wide variety of information, there must be a wide variety of tags for information. As messages must be translated to legacy systems for processing, accurate translation of all tagged information is necessary. Of course, updates and changes to mainframe and other software systems are necessary for continued operation. As with any complex software, only testing in conditions as close as possible to actual operating conditions can simulate the wide variety of combinations of data and data structures that the systems must handle. Accurate testing before deploying any change or update is important in the insurance field in view of the potential consequences to insureds and insurers of errors in policies, certificates and in claims processing.

Referring to FIG.1, an exemplary client-server computer system 100 is shown at a high level. Server 105 may be a web server that exchanges data via http protocols, using xml format documents, over network 140, with client devices 110, 120, 130. In an implementation, client devices 110, 120, 130 may be personal computers running an operating system such as WINDOWS XP, WINDOWS VISTA, OR APPLE TIGER, thin client devices, portable devices such as personal digital assistants (running the PALM OS, by way of example), cell phones, or other devices. Network 140 may be or include the Internet, a corporate intranet, wireless and wired communications channels, and other network features. Server 105 may provide service-oriented architecture (SOA) based services, operating either synchronously or asynchronously. In an implementation, users employing client devices 110, 120, 130 may complete forms served by server 105 and return data with tags compliant with the XML ACORD standard for insurance-related information. The XML compliant data may include additional files, such as image files. The XML compliant data may be compliant with a protocol for exchanging structured information in a decentralized, distributed environment, such as the SOAP protocol. Messages provided by client devices 110, 120, 130 may include SOAP compliant messages with attachments, and may further include custom SOAP requests developed for a particular application. The messages may include SOAP requests compliant with an XML extension, such as the ACORD XML extension. As noted above, the ACORD XML extension is designed for carrying of information specific to the insurance field.

Figure 2:
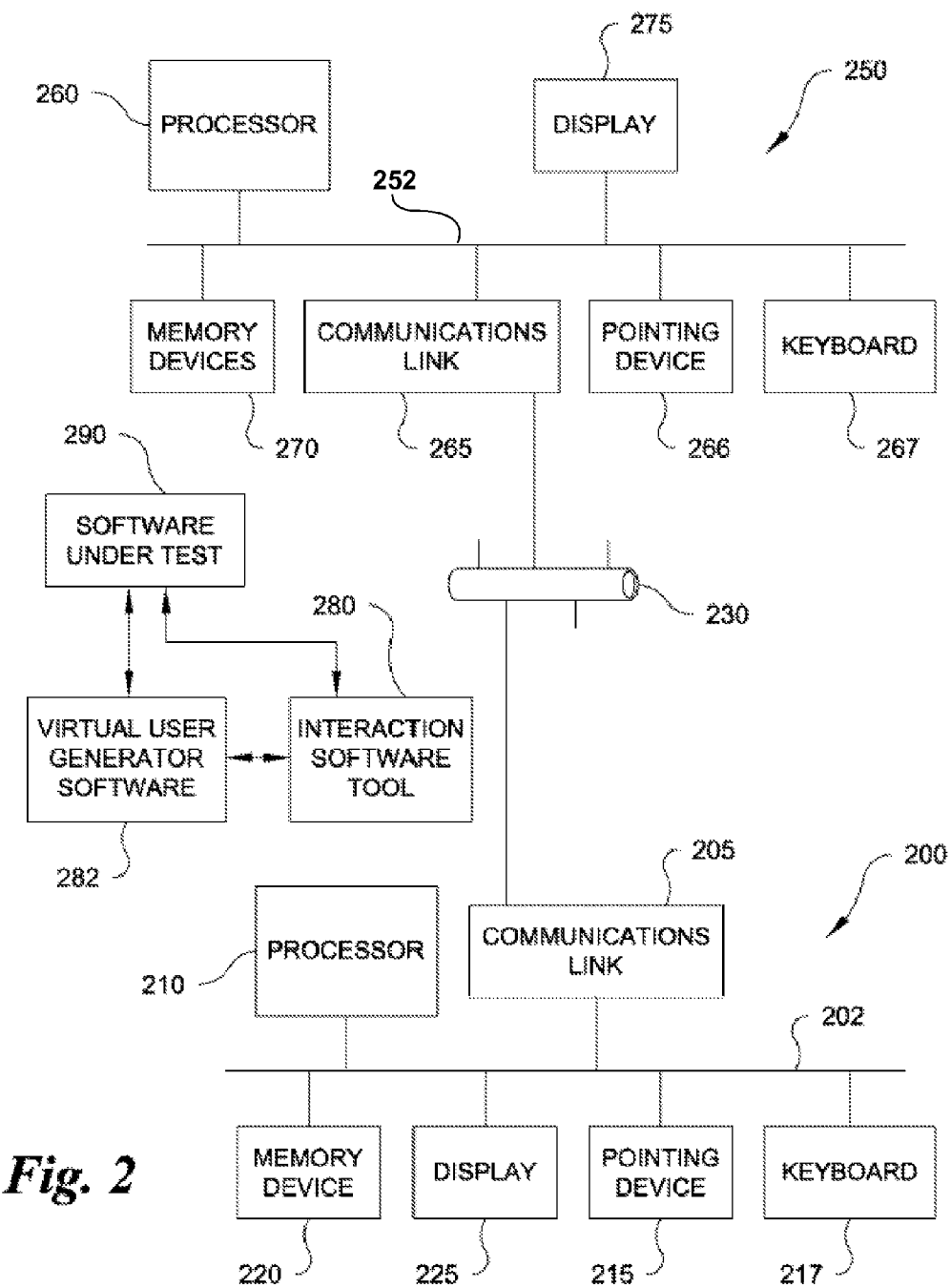
FIG. 2 is a schematic diagram of an exemplary testing machine and associated test server for implementation of a method and system of the invention.

Referring now to FIG. 2, an implementation for load testing of software in a test environment is shown. Computer system 200 may be a testing machine, for testing software under test 290 running on server 250. In computer system 200, components are coupled via bus 202. Processor 210 executes instructions contained in programs stored on stored media. Processor 210 communicates with communications port 205 and memory device 220, receives data from user inputs including pointing device 215 and keyboard 217, provides data for display on display 225. Memory device 220 is configured to exchange data with processor 210, and may store programs containing processor-executable instructions, and values of variables for use by such programs. User interfaces may include workstations having keyboards, touchscreens, pointing devices such as mice, or other user input devices. Communication may be by one or more of suitable communication methods, including over wired or wireless local area networks, including Ethernet 230 by way of example, and wide area networks, and over communications between networks, including over the Internet. Any suitable data and communication protocols may be employed.

Server 250 similarly has bus 252 coupling processor 260, memory devices 270, and communications port 265, and may include pointing device 266, keyboard 267, and display 275 for interaction with a local user.

Figure 3:
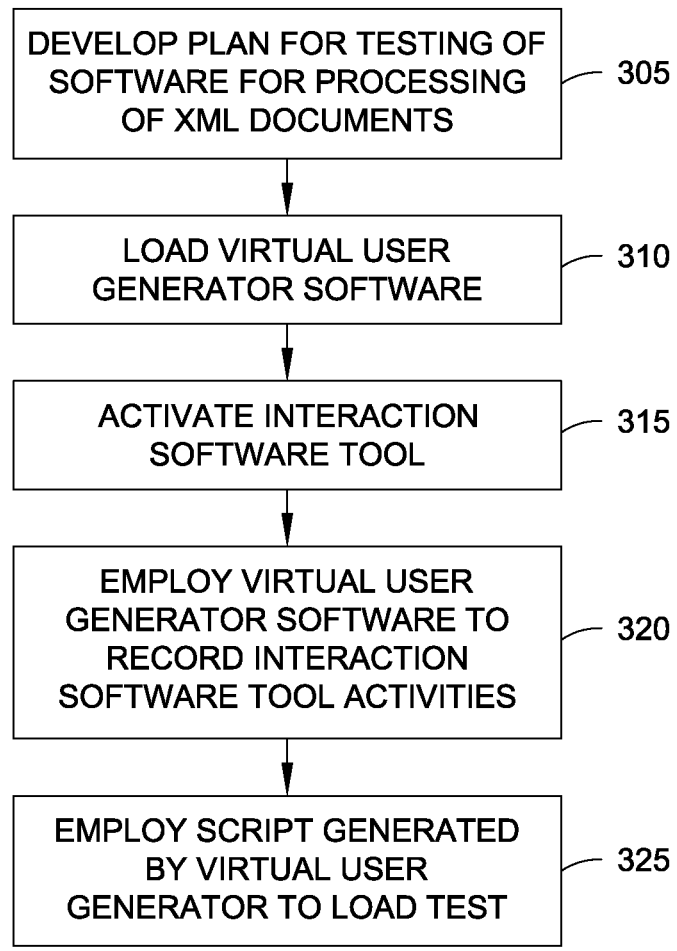
FIG. 3 is a process flow diagram illustrating a method for use in load testing a service-oriented architecture system.

Referring now to FIG. 3, a high level process flow of a method for conducting load testing of server-based software, such as SOA-based services will be described. A plan is developed 305 for determining performance testing requirements. A software tool stored in a memory device and running on a processor on a desktop device may include prompts for input of factors related to performance testing requirements, including number of concurrent users, typical business processes and required response times. Those of ordinary skill in the art are aware of algorithms which such a software tool may run. A plan including number of concurrent users and sample requests may be developed.

A user may load 310 virtual user generator software (such as software 282 of FIG. 2) to run on the testing machine processor. By way of non-limiting example, virtual user generator software may include the VUGEN feature of LOADRUNNER software or THE GRINDER software. From the virtual user generator software, a user activates 315 an interaction software tool (such as interaction software 280 of FIG. 2) for interaction with the server-based software. The operation of the interaction software tool is explained below with reference to FIG. 4. The user may input to the virtual user generator software a network address corresponding to the server based software. The user may further input to the virtual user generator software an identification of the test protocol to be employed, such as http/html. The interaction tool is configured for obtaining the inputs from the virtual user generator software.

The interaction tool proceeds to interact with the server-based software, while the virtual user generator software records 320 the interactions. Virtual user generator software advantageously is able to generate scripts for virtual users based on recording of the activities of the interaction software tool. The scripts are then employed 325 for load testing the software under test.

Figure 4:
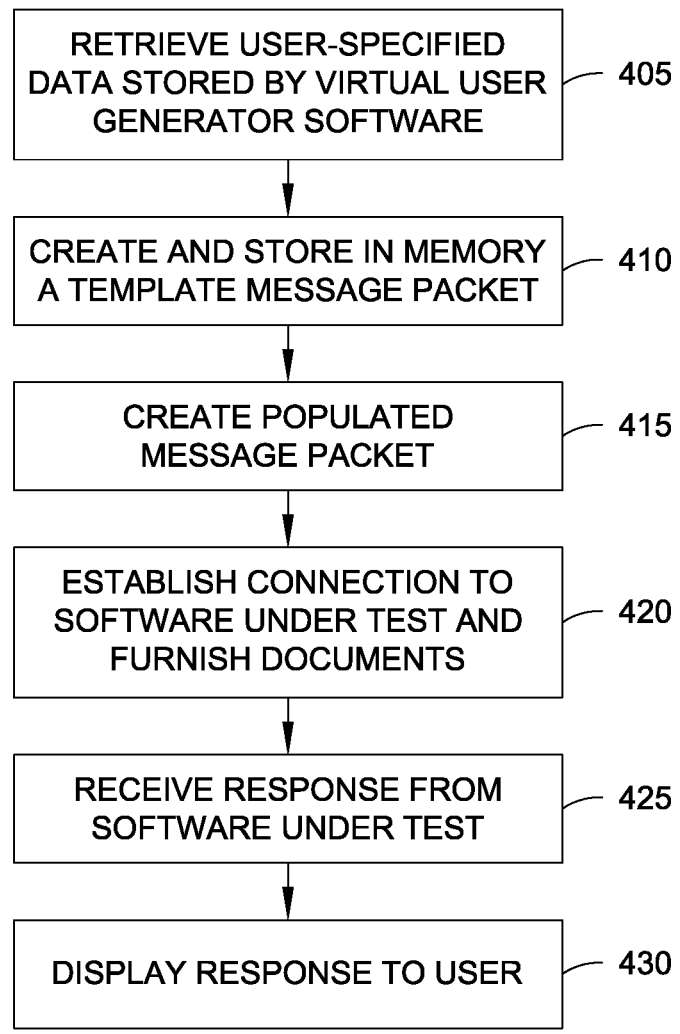
FIG. 4 is a process flow diagram illustrating additional steps in the method of FIG. 3.

Referring now to FIG. 4, a process flow performed by a processor executing instructions set forth in the interaction software tool will be explained. The processor retrieves 405 user-specified information previously stored by the processor executing instructions of the virtual user generator software. Suitable instructions in the interaction software tool permit the processor to identify memory locations where the user-specified information is stored, so that the appropriate information may be accessed. The user-specified information may include an XML message, an address for a service to be tested, an action compliant with a protocol (such as SOAP) for exchanging structured information in a decentralized, distributed environment and associated with the service, and identification of one or more human-readable file attachments. The XML message may be a SOAP message, including a custom SOAP request for a particular application. The processor may create 410 and store in memory a template message package compliant with the protocol. The processor may create 415 and store in memory a populated message package compliant with the protocol by incorporating in the template message package, the XML message, the address, the action and the file attachments. The processor may establish 420 a connection to the server running the software under test, which may be an SOA service and furnish one or more documents and attachments to the service. The server running the software under test will communicate a response. The processor receives 425 the response from the software under test. The processor may cause the reply message to be displayed 430 to a user.

During the furnishing of documents to the service and the return of a response, the virtual user generator software monitors the communications. Based on the documents and the response, the virtual user generator program generates a script for generation of automated requests. The script may be displayed for user review. The user may then cause the processor of the testing machine to implement the script, using the virtual user generator software as an interface. The virtual user generator software will monitor the load testing carried out by implementation of the script and provide load testing data to the user.

Figure 5:
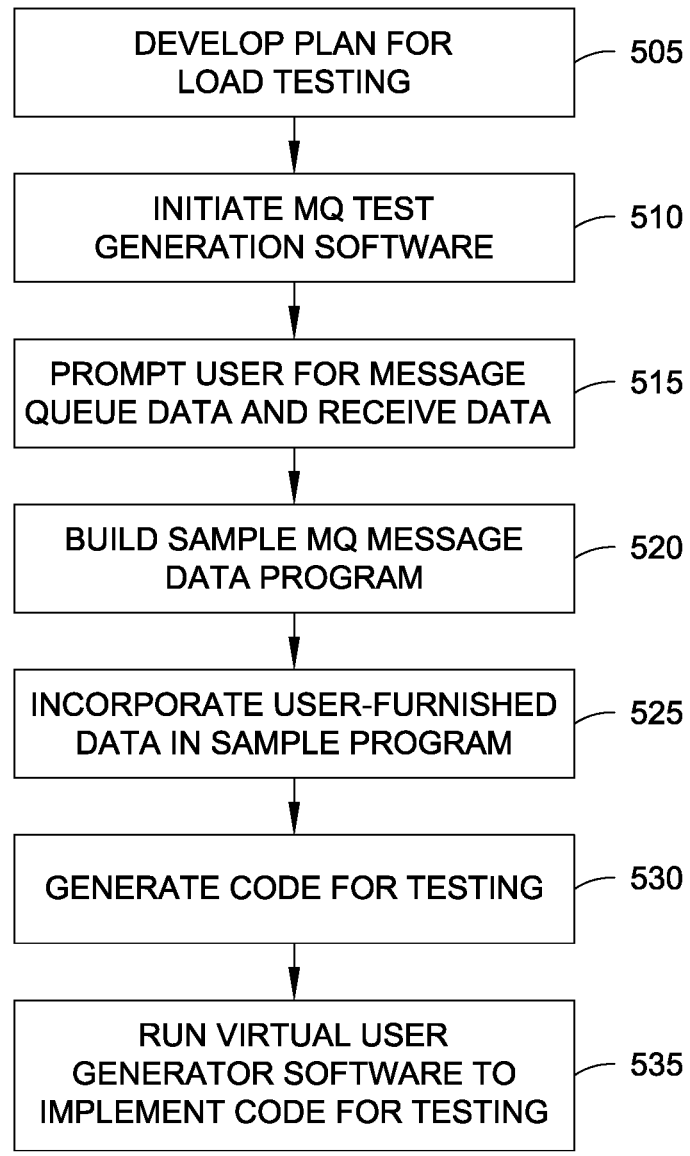
FIG. 5 is a process flow diagram illustrating a method of developing scripts for testing asynchronous communications protocol applications.

Referring to FIG. 5, a high level process flow for a method for developing scripts for conducting load testing of software using asynchronous communications protocols, such as software using message queues (MQ) running on a mainframe system. A plan is developed 505 for determining performance testing requirements. A software tool stored in a memory device and running on a processor on a desktop device may include prompts for input of factors related to performance testing requirements, including number of concurrent users, typical business processes and required response times. Those of ordinary skill in the art are aware of algorithms which such a software tool may run. A plan including number of concurrent users and sample requests may be developed.

A user may initiate 510 MQ test generation software to run on the testing machine processor. The processor, executing instructions in the MQ test generation software, prompts 515 the user for information concerning the MQ application. The requested information may include a host name, a QManager name, a Request Queue name, a Response Queue Name and a Channel name. The processor receives the user-furnished information in response. The processor then executes instructions to build 520 a sample MQ message program. The processor then incorporates 525 the user-furnished information in the sample MQ message program. Based on the sample MQ message program loaded with user-furnished information, the processor generates 530 code for testing the application. The code may be in JAVA format, for example. A user then initiates 535 virtual user generator software. By way of non-limiting example, virtual user generator software may include the VUGEN feature of LOADRUNNER software or THE GRINDER software. The code for testing the application is furnished to the virtual user generator software, such as by user action. Use of JAVA code may be initiated by user selection of a JAVA VUSER protocol in LOADRUNNER software, for example. The JAVA code permits the virtual user software to interact with the MQ protocol device. The virtual user generator software will monitor the interactions and provide reports for user review.

Figure 6A:
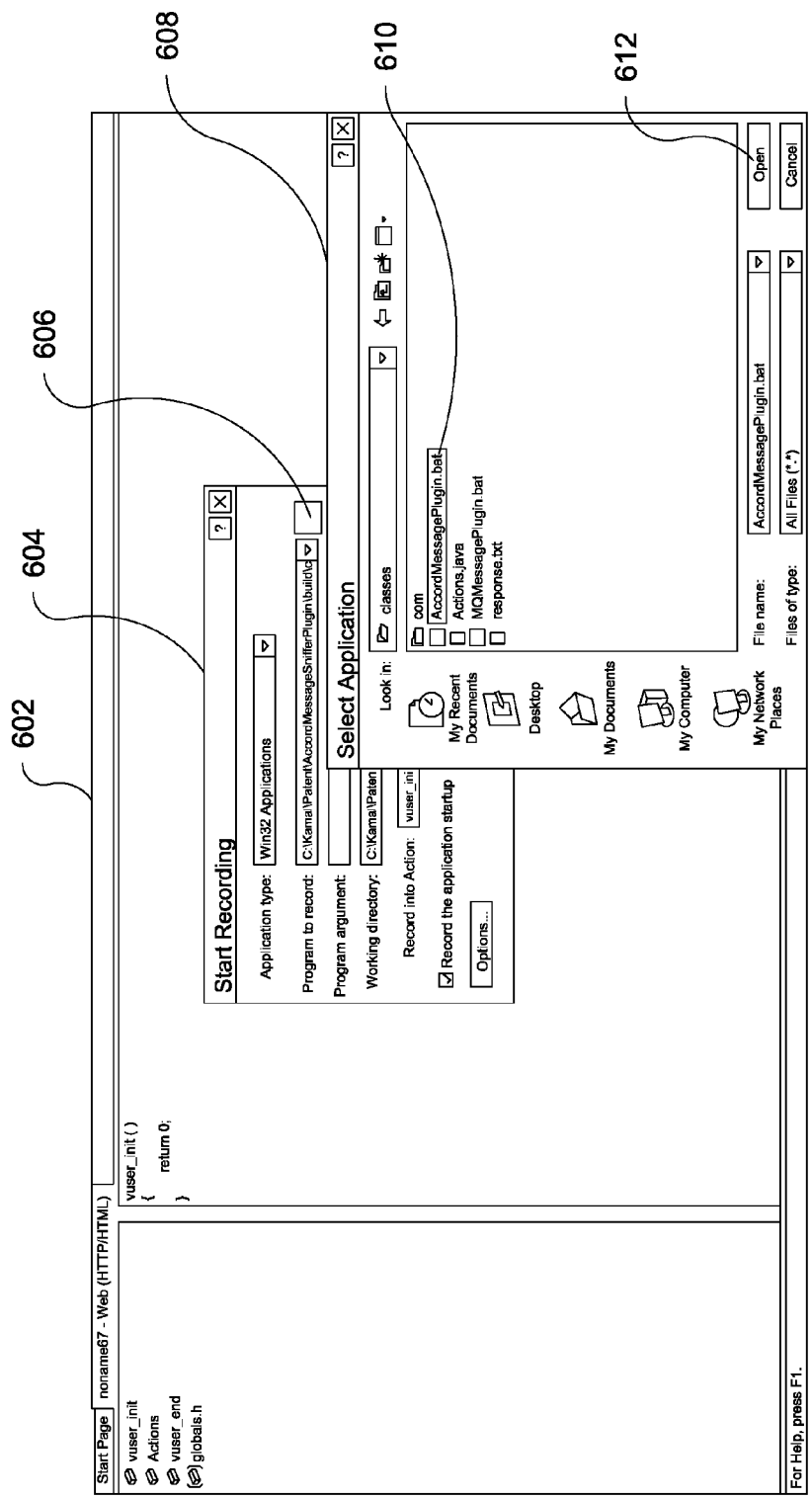
FIGS. 6A to 6E are exemplary screen shots created in connection with an implementation of a method illustrated in FIG. 4.
Figure 6B:
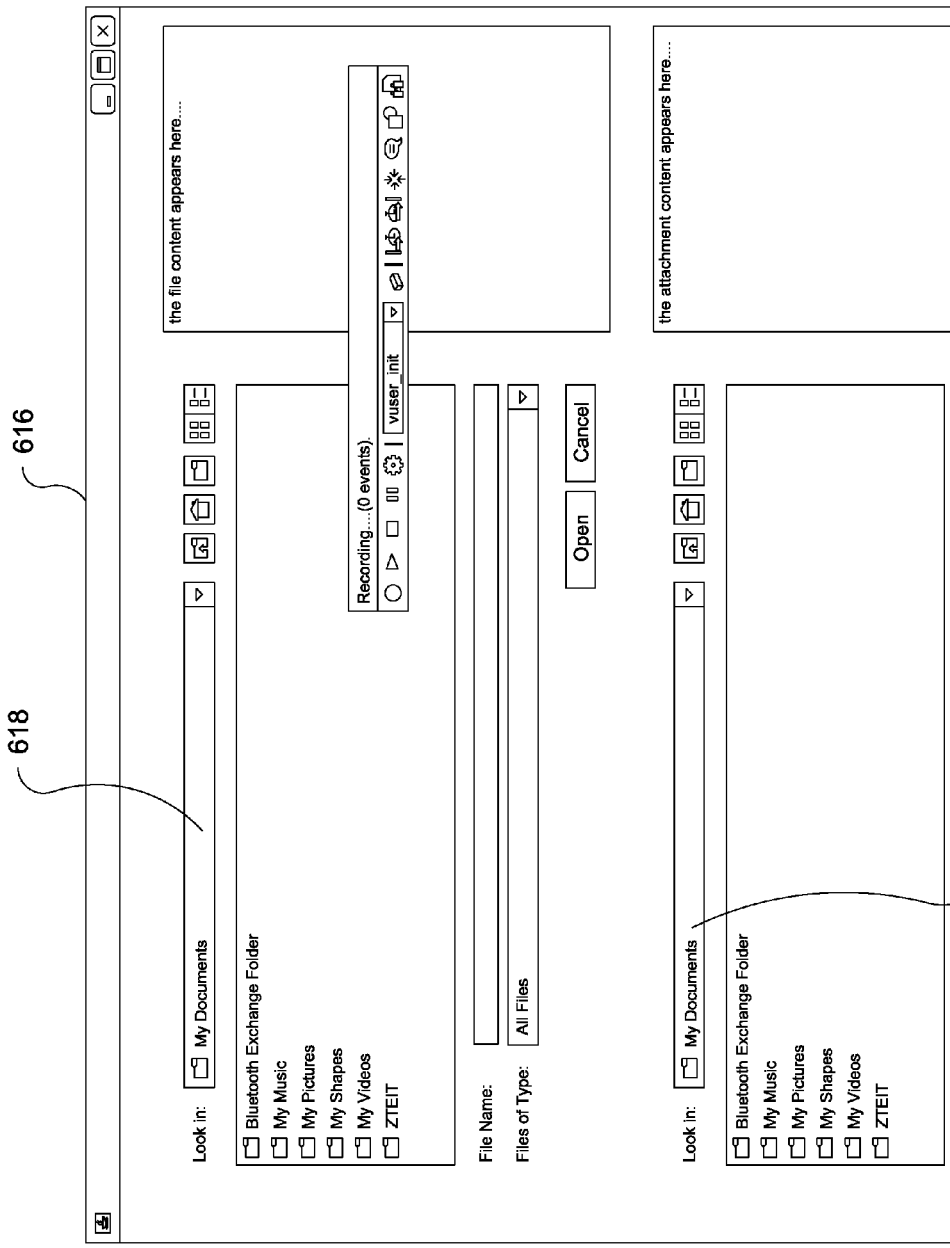
Figure 6C:
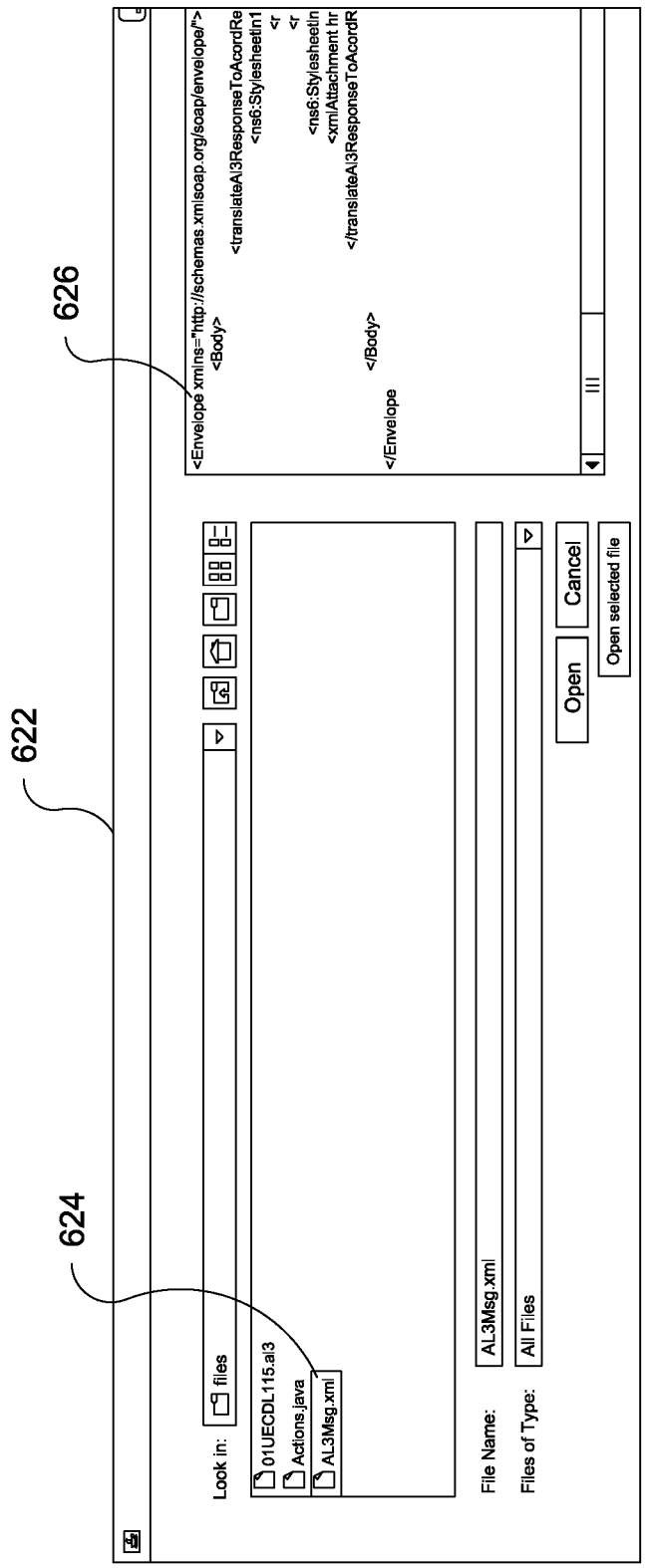
Figure 6D:
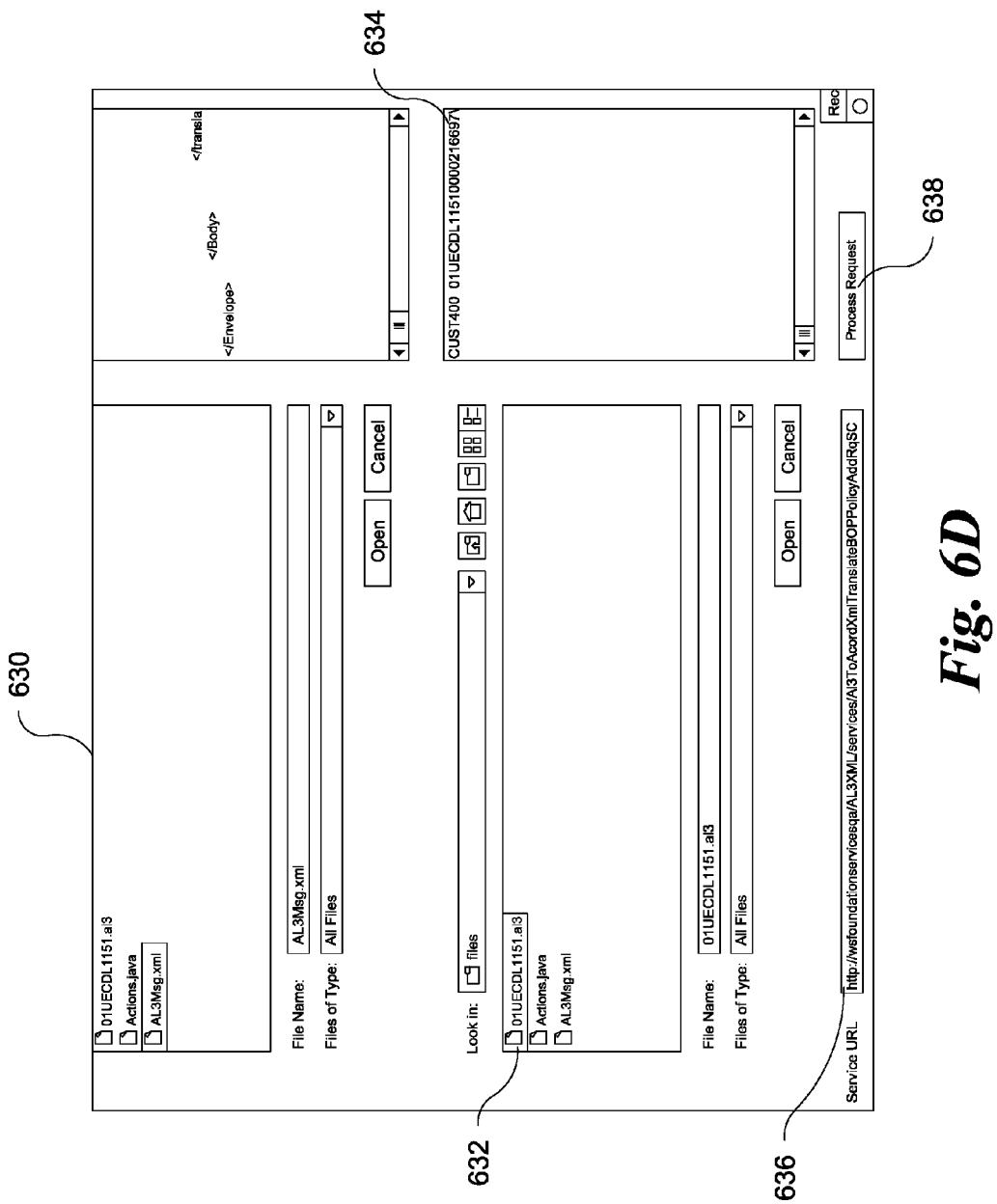

Exemplary user interface screens associated with an embodiment of the method illustrated and discussed above with reference to FIGS. 3 and 4 are shown in FIGS. 6A-6E. In an implementation, a user has loaded and caused a processor to begin executing virtual user generator software. In the illustrated example, the virtual user generator software is MERCURY LOADRUNNER. The user may select, from a new virtual user window, a protocol script. The user is then presented by the virtual user generator software, referring to FIG. 6A, with window 602 and start recording dialog box 604. Start recording dialog box 604 includes a prompt for a program to record. The user may initiate by selecting button 606 a window 608 to browse folders until the interaction software tool 610 is identified. By clicking on button 612, the user instructs the virtual user generator software to cause the interaction software tool code to be loaded in memory and for the processor to begin executing the instructions in the code. Referring to FIG. 6B, the interaction software tool code causes the processor to display window 616, including prompt 618 to select an XML message and prompt 620 to select an attachment to the XML message. Referring to FIG. 6C, the interaction software tool has caused a portion of window 616 to update to window 622. The user has located an XML message 624, which the interaction software tool displays in box 626. Referring now to FIG. 6D, the interaction software tool is displaying window 630. The tool is prompting the user for the XML message, the attachment and the service address. As noted above in connection with FIG. 6C, the user has identified the XML message and has identified the attachment at 632. Data related to the attachment appears in window 634. The attachment may be a photograph, a video, a text file, a spreadsheet file, or another type of file. The user has been prompted to provide the service address in window 636, and has done so. Clicking on button 638 sends an instruction to the interaction software tool to process the request using the furnished message, attachment and service address data.

Figure 6E:
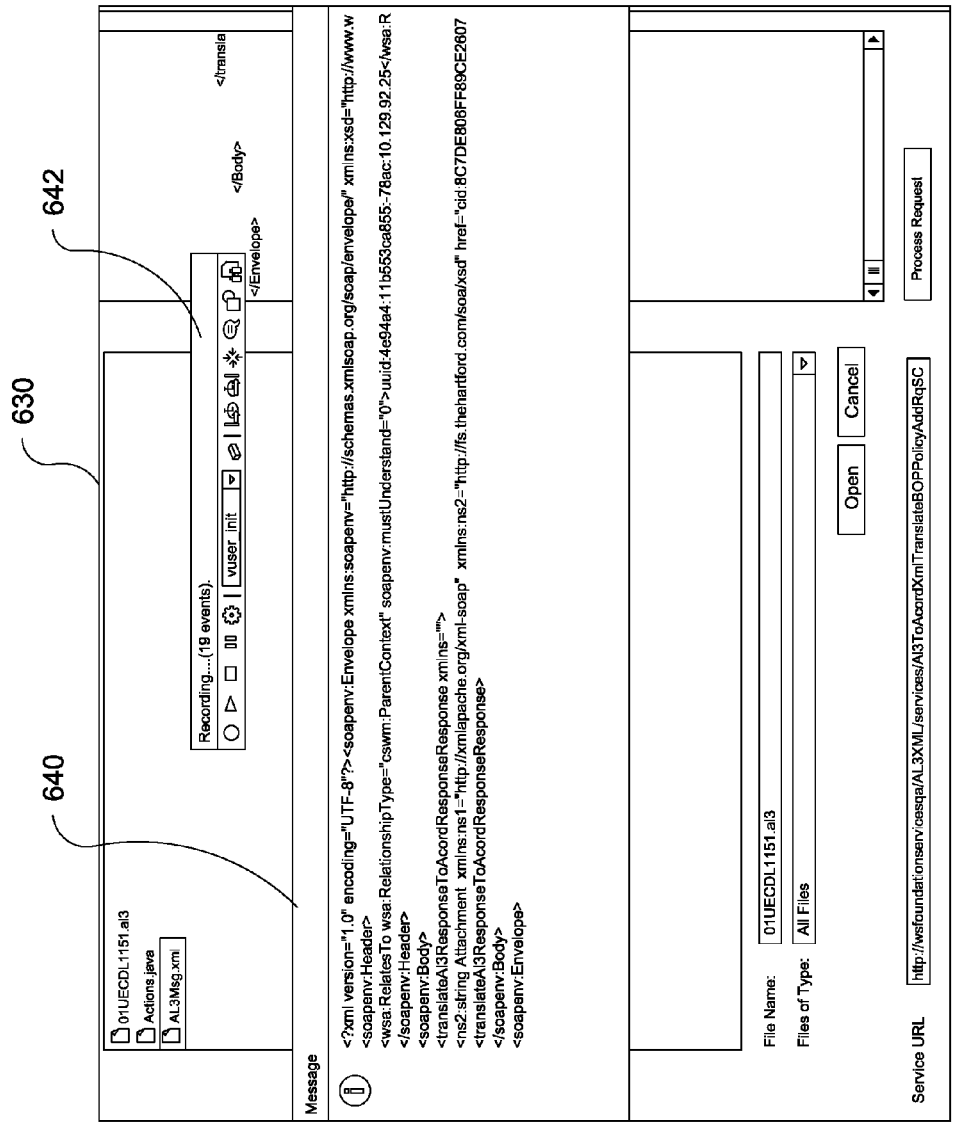

Referring now to FIG. 6E, window 630 continues to be displayed. The interaction software tool has provided the message and attachment in a format which the virtual user generator program can process and forward the message and attachment to the service identified by the address provided in window 636. The service may be, for example, a test implementation of a mainframe insurance transaction processing system. The service provides a response, which the code of the interaction software tool causes to be displayed for the user, such as in box 640. An experienced user may be able to examine the displayed response for anomalous results. The virtual user generator software may also cause the processor to execute instructions from a recording module to record the exchange of information. The virtual user generator software may cause the processor to display a box 642 summarizing the detected exchanged information.

Referring to FIG. 6F, the virtual user generator software is able to use the recorded instructions to generate code for providing simulated users. In an implementation, virtual user generator software causes window 646 to be displayed.

Window 646 displays exemplary code for providing simulated users. In this example, the code is written in a version of the C programming language, but other programming languages may be used.

Figure 7A:
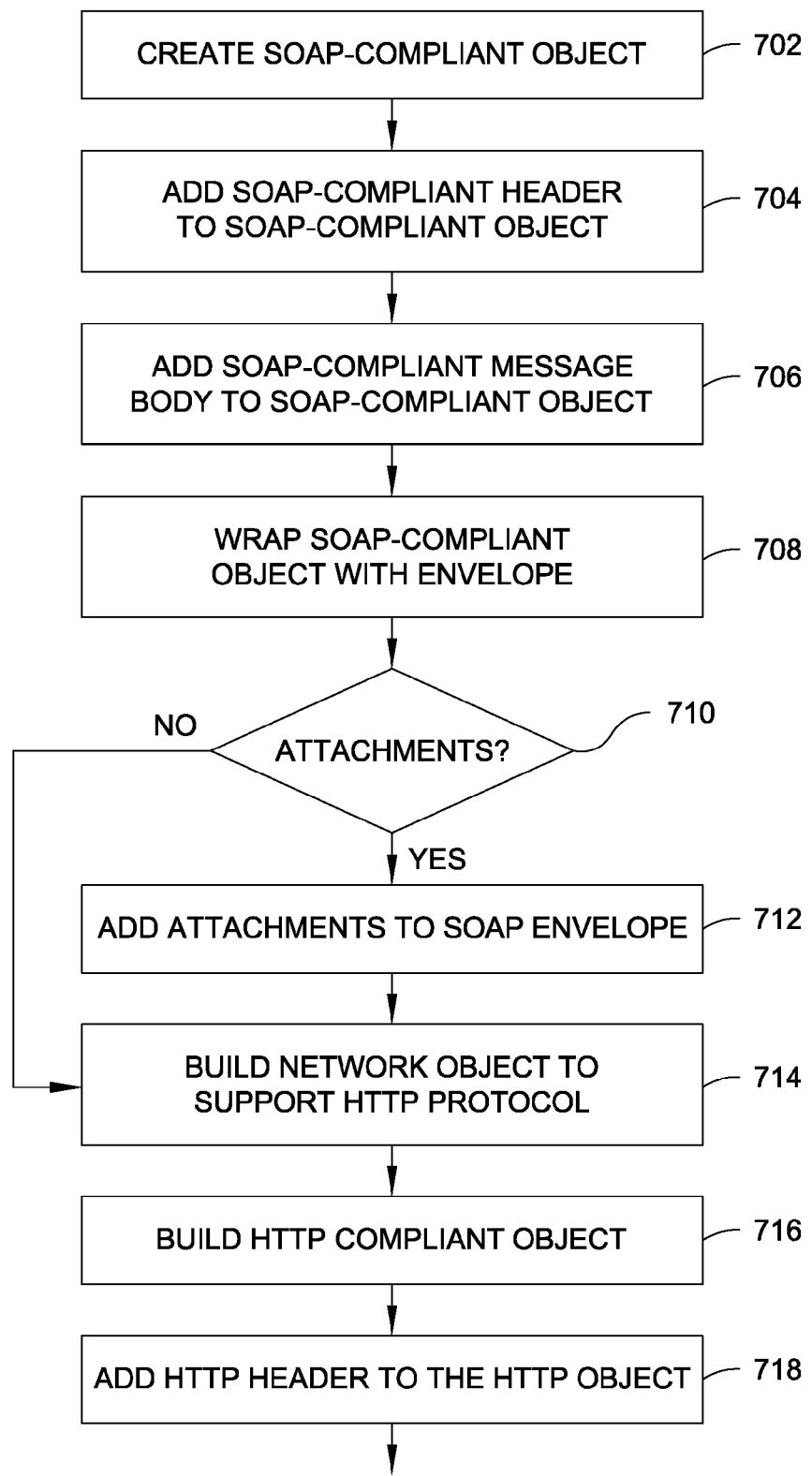
FIGS. 7A and 7B are a process flow diagram illustrating additional steps in an implementation of a method of FIG. 4.
Figure 7B:
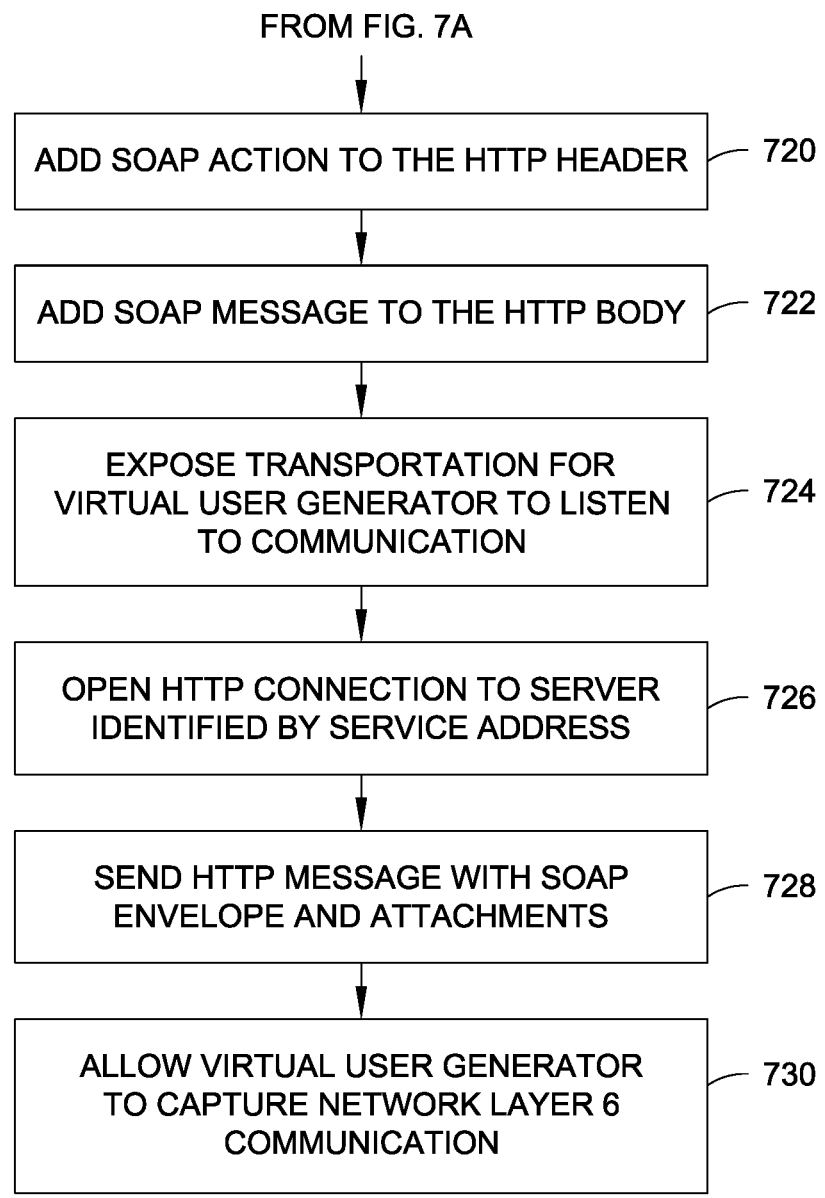

Referring now to FIG. 7, a detailed process flow of steps illustrated and described in connection with FIG. 4 above is illustrated. The process flow may be implemented employing JAVA programming language. Open source software packages, such as JAVA.io, JAVA.net, JAVA.util and JAVA.xml, may be employed in developing a JAVA programming language based tool to implement the process flow. In general terms, the step of creating a template message packet may include creating 702 an object compliant with a protocol, such as a SOAP compliant object. The SOAP compliant object may be created without reference to the message header or message payload. The following process flow will be described with reference an embodiment employing SOAP-compliant and HTTP compliant data elements. In other embodiments, data elements compliant with different protocols may be employed. A SOAP-compliant header may be created 704 and added to the SOAP-compliant object. The header may incorporate message header information provided by XML file content and the service location. A SOAP-compliant body may be created 706 and added to the SOAP object. The body may incorporate data from the XML message. In reading the XML message, in an embodiment, one line may be read at a time, and the message may be returned as a string. The SOAP-compliant object, including the header and object, may be wrapped 708 with a SOAP envelope element. If there are 710 attachments, then attachments may be added 712 to the SOAP envelope element. It will be appreciated that the attachment is associated with a logical structure, namely the SOAP envelope element, distinct from the message payload.

The process flow then proceeds to building 714 of an object suitable for transmission via a suitable network communications protocol, such as http. A network object is built that supports a layer 6, or presentation layer, in the seven layer OSI Model, protocol. In an implementation, http may serve as a presentation layer protocol. The process flow then proceeds to the step of building an http object 716. An http header is then added 718 to the http object, using address data input by the user, for example. A SOAP compliant action 720 is then added to the http header. The SOAP message, including the SOAP envelope with attachments, is then added 722 to the http body. The transportation is exposed 724 to other tools, such as the virtual user generator tool, to permit the other tools to perform listening operations, and thereby record the communication steps. An http connection is opened 726 to the target server identified by the service address. The http message is sent 728 to the target server along with the SOAP envelope and attachments. The virtual user generator, or other tool, is permitted to capture 730 the network layer 6 communication, e.g., http communication. As the message body and attachment have been separately handled by the process of creating the separate SOAP envelope, the virtual user generator is able to capture the communication accurately.

Figure 8A:
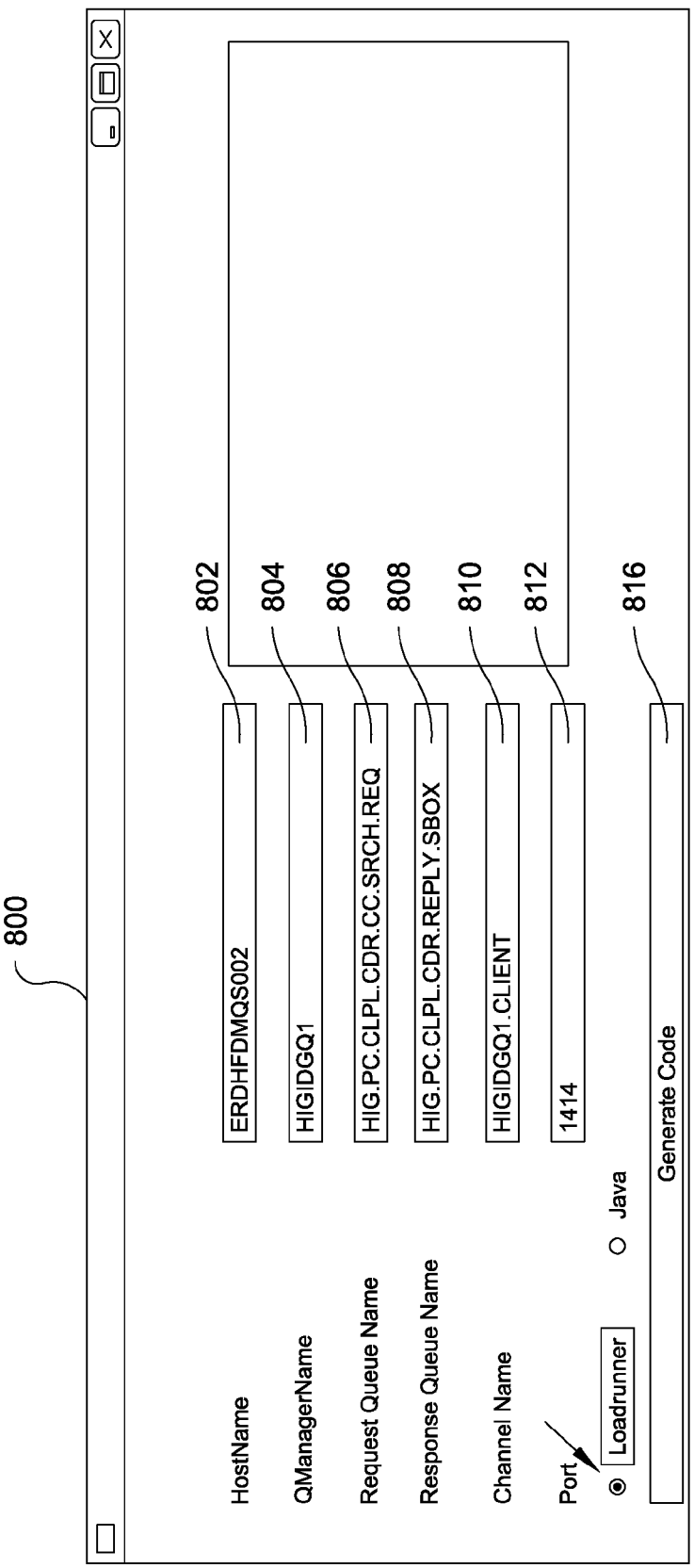
Figure 8B:
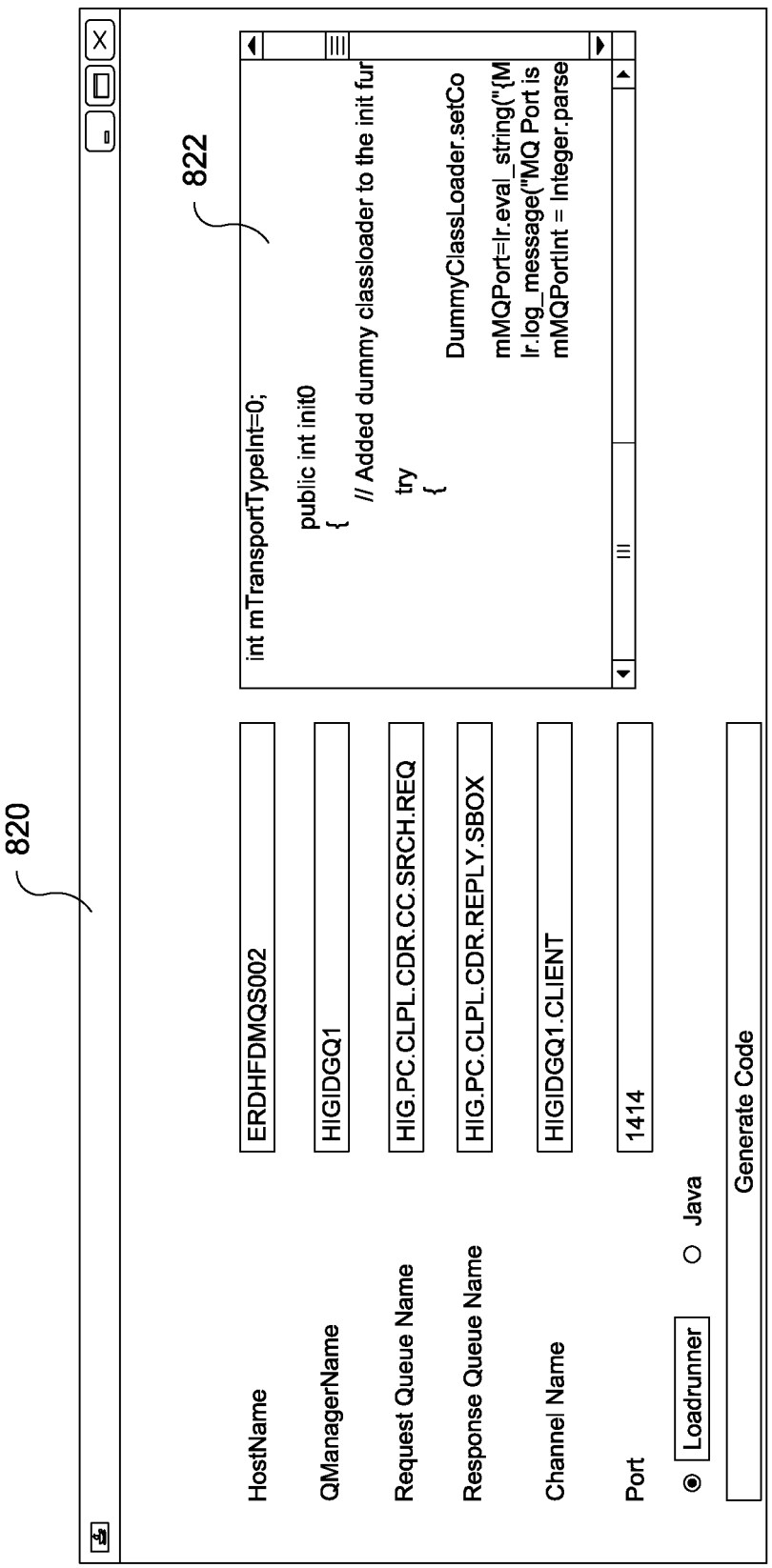

Referring now to FIG. 8A, an exemplary screen shot of MQ test generation software is shown, and particularly a screen 800 prompting a user to input a host name 802, a QManager name 804, a Request Queue name 806, a Response Queue Name 808 and a Channel name 810 and a port 812. A selection of applications for generating virtual users may be provided, and here includes LOADRUNNER software and JAVA programming language applications. A user may press the generate code button 816 to cause the test generation software to generate test code. In FIG. 8B, a screen shot of exemplary MQ test generation software is shown, and particularly screen 820, after the code has been generated and is shown in window 822. The code in this example is JAVA code. The user may select JAVA code from a LOADRUNNER software window, and then copy the generated code to LOADRUNNER software application, as indicated by FIG. 8C, where LOADRUNNER software screenshot 830 shows JAVA code, as indicated by added box 832, loaded into the virtual user generator tool.

Figure 9:
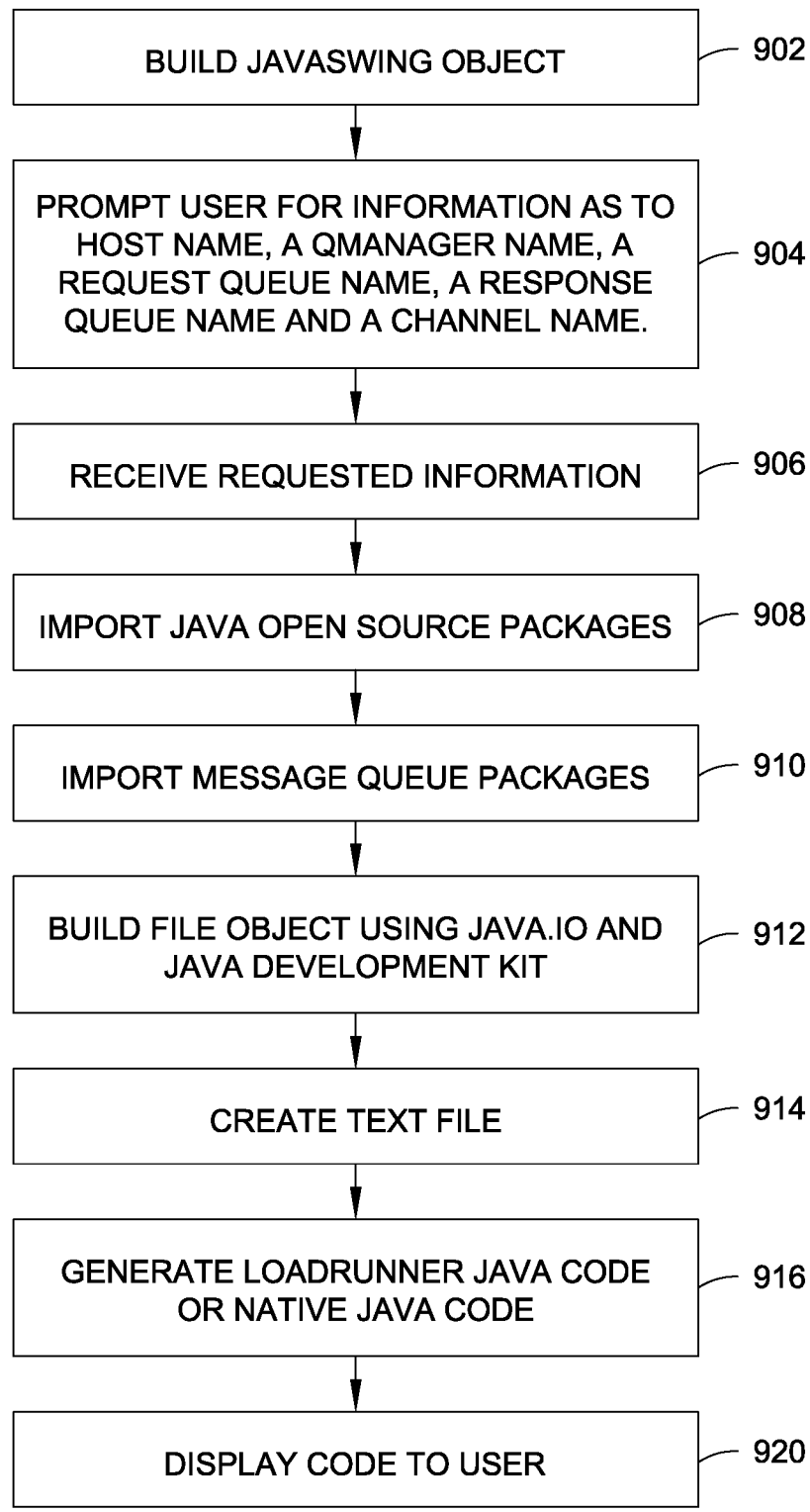
FIG. 9 is a process flow diagram illustrating additional steps in an implementation of a method of FIG. 5.

Referring now to FIG. 9, a detailed process flow of steps carried out in an embodiment by the MQ test generation software is shown. A suitable object for providing user prompts and receiving information input, such as a JAVASWING object, is created 902. A screen display, such as the display of FIG. 8A, is created to prompt 904 the user for host name, a QManager name, a Request Queue name, a Response Queue Name and a Channel name. The user may be prompted to identify a type of code, such as LOADRUNNER or JAVA, to be generated. The requested information is received 906 from the user. JAVA source packages are imported 908, from a source such as a SUN server available over the internet. Message queue packages are imported 910; these packages may be commercial packages available from IBM, by way of example. A suitable file object is built 912 using JAVA tools, such as JAVA.io and other suitable JAVA tools. A suitable text file is opened 914. The JAVA code is generated 916 using the file object, the JAVA packages and message queue packages, and inserted into the text file. The text file is displayed 920 to the user for the user to copy and insert into LOADRUNNER or another virtual user generator.

It will be appreciated that the XML files used above may be ACORD XML files having insurance transaction information and file attachments such as photographs carrying insurance transaction information. The responses from the test server may be insurance information reflecting business processes executed by the test server and responsive to the XML files.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 210 executing instructions contained in programs which may be stored in a storage medium, such as local memory 220. It will be appreciated that any of the steps in the methods in accordance with the invention described herein may be so implemented.

By way of non-limiting example, an advantage of an implementation of the method and system is a substantial savings in programmer time in generating scripts for testing of SOA systems. By way of further non-limiting example, an advantage of an implementation of the message and system is a capacity to provide load testing using a script that emulates users for testing of MQ applications.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for use in load testing, comprising:
   a processor; and
   a memory storage device in communication with the processor, the memory storage device storing processor-executable instructions which, when executed by the processor, cause the processor to:
   generate for display on a display device data indicative of a user interface, the user interface including fields for input of an Extensible Markup Language (XML) message, a file for attachment to the XML message, an address of a service to be tested and an action compliant with a protocol;
   receive via the user interface an XML message, a path of a file, an address of a service to be tested, and an action compliant with a protocol;
   generate a message package, compliant with the protocol, incorporating the XML message, the file, the address and the action; and
   provide the message package to the service and receive a response, for monitoring by the processor executing a virtual user generator program, the processor being configured to execute the virtual user generator program to generate a script for load testing based on the monitoring;
   wherein the receipt of the XML message, the path of the file, the address of the service to be tested, and the action, via the user interface, is sufficient for the generation of the message package.

2. The computer system of claim 1, wherein the instructions further cause the processor to create and store in memory a template message package compliant with the protocol, and the creating the message package is performed by populating the template message package.

3. The system of claim 1, wherein the protocol is Simple Object Access Protocol (SOAP).

4. The computer system of claim 3, wherein the instructions cause the processor to, in creating the message package, separately (a) generate a message body, incorporating data from the XML message, and (b) generate an envelope element comprising the attachment.

5. The computer system of claim 1, wherein the instructions cause the processor, to, in generating the message package:
   generate an object compliant with the protocol;
   add a header and a message body, compliant with the protocol, to the generated object;
   wrap the object with an envelope; and
   add one or more attachments to the envelope.

6. A computer-implemented method for use in connection with load testing of computer systems, comprising:
   generating, by a processor of a computer system, for display on a display device, data indicative of a user interface, the user interface including fields for input of an Extensible Markup Language (XML) message, a file for attachment to the XML message, an action compliant with a protocol, and an address of a service to be tested;
   receiving, by the processor, via the user interface, an XML message, a path of a file, an action, and an address of a service to be tested; and
   generating, by the processor, a message package, compliant with the protocol, incorporating the XML message, the file, the address and the action; and
   providing, by the processor, the message package to the service and receiving a response, for monitoring by the processor executing a virtual user generator program, the processor being configured to execute the virtual user generator program to generate a script for load testing based on the monitoring;
   wherein the receipt of the XML message, the path of the file and the address of the service to be tested via the user interface is sufficient for the generation of the message package.

7. The computer-implemented method of claim 6, further comprising generating a template message package compliant with the protocol, and the generating the message package is performed by populating the template message package.

8. The computer-implemented method of claim 6, wherein the protocol is Simple Object Access Protocol (SOAP).

9. The computer-implemented method of claim 8, wherein the generating the message package comprises generating a message body, incorporating data from the XML message, and separately generating an envelope element comprising the attachment.

10. The computer-implemented method of claim 6, wherein the generating the message package comprises:
generating an object compliant with the protocol;
adding a header and a message body, compliant with the protocol, to the generated object;
wrapping the object with an envelope; and
adding one or more attachments to the envelope.

11. A computer system for use in load testing computer software applications employing an asynchronous communications protocol on a computer system for testing, comprising:
a processor; and
a memory storage device in communication with the processor, the memory storage device storing processor-executable instructions which, when executed by the processor, cause the processor to:
generate data indicative of a user interface, the user interface configured for input of: a connection name for the computer system for testing and message queue identification information,
receive via the user interface the connection name for the computer system for testing and the message queue identification information;
generate, based on the received connection name and message queue identification information, executable message queue code, for providing messages to a message queue and receiving replies from the message queue, the executable message queue code having undefined variables, wherein the receipt of the connection name and the message queue identification information, is sufficient for the processor to generate the executable message queue code;
assign definitions to the undefined variables based on the received inputs; and
based on the definitions and the executable message queue code, generate load test executable code, configured to load test and permit monitoring of the testing by the processor executing virtual user generator code.

12. The system of claim 11, wherein the asynchronous communications protocol is a Message Queue (MQ) protocol.

13. The system of claim 11, wherein the message queue identification information comprises: the message queue manager name corresponding to the message queue for the computer system for testing, a message queue channel name for the message queue, a request queue name and a response queue name.

14. The system of claim 11, wherein the load test executable code is in JAVA format and the instructions further cause the processor to cause the user interface to display the load test executable code.

15. The system of claim 14, wherein the instructions further cause the processor import message queue packages.

16. A computer-implemented method, in a computer having a processor and a memory coupled to the processor, for use in load testing computer software applications employing an asynchronous communications protocol on a computer system for testing, comprising:
generating by the processor data indicative of a user interface, the user interface configured for input of: a connection name for the computer system for testing and message queue identification information,
receiving by the processor via the user interface the connection name for the computer system for testing and the message queue identification information;
generating, by the processor, based on the received connection name and message queue identification information, executable message queue code, for providing messages to a message queue and receiving replies from the message queue, the executable message queue code having undefined variables, wherein the receipt of the connection name and the message queue identification information, is sufficient for the processor to generate the executable message queue code;
assigning by the processor definitions to the undefined variables based on the received inputs; and
based on the definitions and the executable message queue code, generating by the processor load test executable code, configured to load test and permit monitoring of the testing by the processor executing virtual user generator code.

17. The computer-implemented method of claim 16, wherein the asynchronous communications protocol is a Message Queue (MQ) protocol.

18. The computer-implemented method of claim 16, wherein the message queue identification information comprises: the message queue manager name corresponding to a message queue for the computer system for testing, a message queue channel name for the message queue, a request queue name and a response queue name.

19. The computer-implemented method of claim 16, wherein the load test executable code is in JAVA format and further comprising causing the user interface to display the load test executable code.

20. The computer-implemented method of claim 16, wherein the user interface is further configured for input of an identification of a type of code to be generated.

* * * * *